J. A. STANFIELD.
CHUCK.
APPLICATION FILED DEC. 21, 1916.
1,244,253.
Patented Oct. 23, 1917.
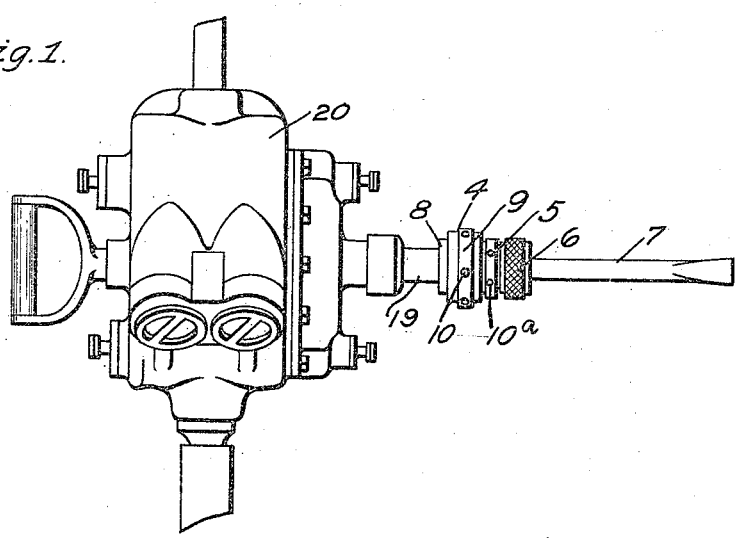
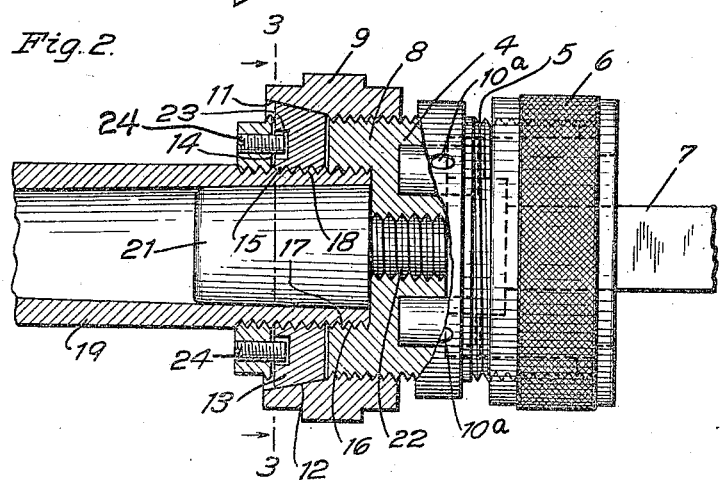
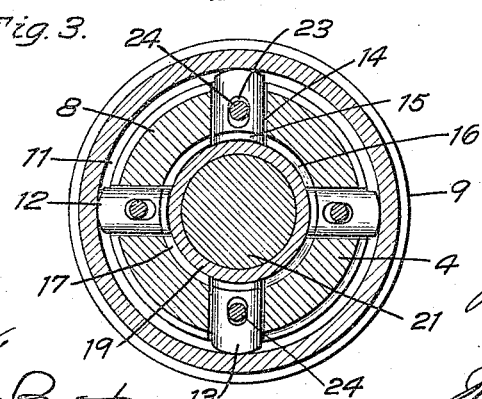
Witnesses:
F. E. Arthur,
W. Thornton Bogert.
Inventor
James A. Stanfield
Walter F. Murray
Attorney

UNITED STATES PATENT OFFICE.

JAMES A. STANFIELD, OF COVINGTON, KENTUCKY, ASSIGNOR OF ONE-HALF TO GEORGE T. PROUT, OF COVINGTON, KENTUCKY.

CHUCK.

1,244,253.  Specification of Letters Patent.  Patented Oct. 23, 1917.

Application filed December 21, 1916. Serial No. 138,158.

*To all whom it may concern:*

Be it known that I, JAMES A. STANFIELD, a citizen of the United States of America, and resident of Covington, in the county of Kenton and State of Kentucky, have invented a new and useful Improvement in Chucks, of which the following is a specification.

An object of my invention is to produce a chuck adapted to be mounted on an externally screw threaded hollow spindle.

A further object is to produce a chuck adapted to be mounted on a hollow spindle in such a manner that the spindle will be reinforced and prevented from crushing or twisting when subjected to the strains imposed upon it by the operation of the tool carried by the chuck, and by the operation of the motor or other driving mechanism to which spindle is attached.

These and other objects are attained in the chuck described in the following specification and illustrated in the accompanying drawings, in which;

Figure 1 is a side elevation of an air driven motor having a chuck embodying my invention attached to the spindle thereof, with a tool mounted in the chuck.

Fig. 2 is a fragmental sectional side elevation of a chuck embodying my invention mounted on a hollow spindle, upon an enlarged scale.

Fig. 3 is a transverse sectional view of the chuck taken on the line 3—3 of Fig. 2.

The chuck embodying my invention is particularly adapted to be mounted on the hollow externally screw threaded spindle of any type of air motor now on the market. Heretofore it has been necessary to use a tool possessing a tapered shank, to fit the spindles of these motors. The objection to such a mounting has been that frequently the tools became loosened to such an extent that the spindle was not properly reinforced and therefore, would have a tendency to twist off. In order to provide means for overcoming this objection, I have devised the chuck now to be described.

My improved chuck consists of a body portion 4 having a screw threaded outer end 5 adapted to receive an internally screw threaded and externally knurled collar 6 for the purpose of retaining a tool 7 in position therein, this construction being one of the usual type. At the opposite end, the body portion 4 is provided with a screw threaded extension 8 adapted to receive a collar 9 which possesses any suitable means, such as pin wrench openings 10, for permitting of its adjustment. This collar at its inner end is provided with a tapered inner surface 11, adapted to engage the inclined end surfaces 12 of wedges 13 reciprocally mounted in radially extending passages 14 formed in the inner end 8 of the body portion 4. The inner ends of the wedges are provided with screw threads 15 which form continuations of screw threads 16 formed on the inner surface of a recess 17 formed in extension 8. These screw threads 15 and 16 are adapted to coöperate with the screw threads 18 of the hollow spindle 19 of the air motor 20, or other driving mechanism. Within the recess the tapered plug 21 is mounted, this plug being provided with a screw threaded shank 22 adapted to mount it centrally of the recess 17 of extension 18 of the body portion 4.

Wedges 13, as disclosed in Figs. 2 and 3, are cylindrical, and since it is necessary to maintain the inclined surfaces 12 thereof in proper position to be engaged by the inclined inner surface 11 of the collar 9, I have provided a series of grooves 23 adapted to receive the ends of a series of set screws 24 mounted in extension 8 as disclosed in Fig. 2. This permits of reciprocation of the wedges within their mounting ways. Plug 21 is preferably provided with a tapered surface corresponding to that of the inner tapered surface of the spindle, so that the plug fits the spindle snugly as disclosed in Figs. 2 and 3.

The operation of attaching the chuck to the spindle is as follows:

First collar 9 is unscrewed as far as necessary to release wedges 13 so that they are free to be moved outwardly. Then the body portion of the chuck is screwed on to the spindle 19, the external screw threads 18 thereof engaging the internal screw threads 16 of recess 17, and also coöperating with screw threads 15 of the radially mounted wedges 13. The chuck is screwed on to the spindle as far as it will go, until the plug 21 is brought to fit the interior of the spindle snugly. The body of the chuck having thus been positioned properly on the spindle, collar 9 is turned upon its screw threads to bring its inclined inner surface 11 in engagement with the inclined ends 12 of the wedges 13 until they have been forced into biting or gripping engagement with the screw threads of the spindle. In their inward movement, the wedges are permitted to reciprocate by reason of the set screw and groove connections, but are prevented from rotating in their mounting apertures 14 because of this pin and groove connection, thus keeping their screw threads in alinement with the screw threads 16. In screwing the body 4 on to the spindle 19, a pin wrench is applied to openings 10ª thereof.

My improved chuck, is particularly adapted for use on hollow spindles since the plug 21 positively prevents the spindle being crushed by inward pressure of the wedges 13. In addition to this, the snug fitting of the plug 21 within the tapered inner surface of the spindle, renders the spindle substantially solid and when the wedges 13 are brought into gripping engagement with the outer surface of the spindle, twisting of the spindle is prevented. This tendency to have the spindle twisted, is further prevented by reason of the fact that the chuck grips the spindle firmly and is prevented from working loose therefrom, thus preventing crystallization of the material of the spindle by reason of elimination of vibration of the connection between the chuck and the spindle.

Having thus described my invention, what I claim is;

1. A chuck comprising a body portion having a recess at one end and having a passage communicating with the recess, a plug extending from the body portion into the recess and having its outer surface spaced from the walls of the recess, adapted to receive the walls of a hollow spindle, a hollow spindle, a wedge reciprocably mounted in the passage, adapted to engage at its inner end the surface of the spindle, and means engaging the outer end of the wedge, for forcing and maintaining the wedge in clamping engagement with the spindle.

2. A chuck comprising a body portion having a recess at one end and having a passage communicating with the recess, a plug extending from the body portion into the recess and having its outer surface spaced from the walls of the recess, adapted to receive the walls of a hollow spindle, a hollow spindle, a wedge reciprocably mounted in the passage, adapted to engage at its inner end the surface of the spindle, and a collar reciprocably mounted on the body portion and having an inclined surface adapted to engage the outer end of the wedge to force and maintain the wedge in clamping engagement with the spindle.

3. A chuck comprising a body portion having a recess at one end and having a passage communicating with the recess, a plug extending from the body portion into the recess and having its outer surface spaced from the walls of the recess, adapted to receive the walls of a hollow spindle, a hollow spindle, a wedge reciprocably mounted in the passage, adapted to engage at its inner end the surface of the spindle, and a collar having a tapered surface for engaging the outer end of the wedge, said collar and body portion having coöperating screw threads formed thereon, adapted to permit of reciprocation of the collar to and from said wedge whereby the wedge may be forced and maintained in engagement with the spindle.

4. A chuck comprising a body portion having an internally screw threaded recess at one end and having a passage communicating with the recess, said recess being adapted to receive the screw threads of an externally screw threaded hollow spindle, an externally screw threaded hollow spindle, a wedge reciprocably mounted in the passage and having screw threads formed on its inner end and corresponding with the screw threads of the recess, adapted to engage the screw threads of the spindle, and means engaging the outer end of the wedge, for forcing and maintaining the wedge in clamping engagement with the spindle.

5. A chuck comprising a body portion having an internally screw threaded recess at one end and having a passage communicating with the recess, a plug extending from the body portion into the recess and having its outer surface spaced from the walls of the recess, adapted to receive the screw threads of an externally screw threaded hollow spindle, an externally screw threaded hollow spindle, the plug extending into the hollow of the spindle, a wedge reciprocably mounted in the passage and having screw threads formed at its inner end for coöperation with the screw threads of the recess, and means engaging the outer end of the wedge for forcing and maintaining the wedge in clamping engagement with the spindle, with the screw threads of the wedge engaging the screw threads of the spindle.

6. A chuck comprising a body portion having an internally screw threaded recess at one end and having a passage communicating with the recess, said recess being adapted to receive the screw threads of an externally screw threaded hollow spindle, an externally screw threaded hollow spindle, a wedge reciprocably mounted in the passage and having screw threads formed in its inner end, for coöperation with the screw threads of the recess, means for mounting the wedge in position whereby its screw threads will be held in alinement with the screw threads of the recess, and means for engaging the outer end of the wedge and for forcing and maintaining the wedge in clamping engagement with the spindle.

7. A chuck comprising a body portion having an internally screw threaded recess at one end and having a passage communicating with the recess, a plug extending into the recess and having its outer surface spaced from the walls of the recess, and adapted to receive the walls of an externally screw threaded hollow spindle, an externally screw threaded hollow spindle, a wedge reciprocably mounted in the passage and having screw threads formed at its inner end for coöperation with the screw threads of the recess, means for maintaining the wedge in position whereby its screw threads will be maintained in alinement with the screw threads of the recess, and means engaging the outer end of the wedge for forcing and maintaining the wedge in clamping engagement with the spindle, whereby the screw threads of the wedge will be maintained in engagement with the screw threads of the spindle.

8. A chuck comprising a body portion having an internally screw threaded recess at one end and having a passage communicating with the recess, said recess being adapted to receive the screw threads of an externally screw threaded hollow spindle, an externally screw threaded hollow spindle, a wedge reciprocably mounted in the passage and having screw threads at its inner end, and a collar reciprocably mounted on the body portion and having an inclined surface adapted to engage the outer end of the wedge, for forcing and maintaining the screw threads of the wedge in engagement with the screw threads of the spindle when the collar is reciprocated.

9. A chuck comprising a body portion having an internally screw threaded recess at one end and having a passage communicating with the recess, a plug extending into the recess and having its outer surface spaced from the walls of the recess, adapted to receive the walls of an externally screw threaded hollow spindle, an externally screw threaded hollow spindle, the screw threads of the spindle coöperating with the screw threads of the recess, a wedge reciprocably mounted in the passage and having screw threads formed at its inner end and adapted to engage at its outer end the surface of the spindle, and a collar reciprocably mounted on the body portion, having an inclined surface adapted to engage the outer end of the wedge and to force and maintain the screw threads of the wedge in clamping engagement with the screw threads of the spindle, when the collar is reciprocated.

10. A chuck comprising a body portion having an internally screw threaded recess at one end and having a passage communicating with the recess, adapted to receive the screw threads of an externally screw threaded hollow spindle, an externally screw threaded hollow spindle, a wedge reciprocably mounted in the passage and having screw threads formed at its inner end, a collar mounted on the body portion having an inclined surface adapted to engage the outer end of the wedge, said collar and body portion having coöperating screw threads formed thereon adapted to permit of reciprocation of the collar to force and maintain the screw threads of the wedge in clamping engagement with the screw threads of the spindle.

11. A chuck comprising a body portion having an internally screw threaded recess at one end and having a passage communicating with the recess, a plug extending from the body into the recess and having its outer surface spaced from the walls of the recess, adapted to receive the walls of an externally screw threaded hollow spindle, an externally screw threaded hollow spindle, the screw threads of the spindle and recess coöperating with one another, a wedge reciprocably mounted in the passage, having its inner end communicating with the recess and having screw threads formed on its inner end, a collar mounted on the body portion and having an inclined surface adapted to engage the outer end of the wedge, said collar and body portion having coöperating screw threads formed thereon, adapted to permit of reciprocation of the collar to force and maintain the screw threads of the wedge in clamping engagement with the screw threads of the spindle.

12. A chuck comprising a body portion having an internally screw threaded recess at one end and having a passage communicating with the recess, adapted to receive the screw threads of an externally screw threaded hollow spindle, an externally screw threaded hollow spindle, a wedge reciprocably mounted in the passage and having screw threads formed at its inner end for coöperation with the screw threads of the recess, means for mounting the wedge in position whereby its screw threads will be maintained in alinement with the screw threads of the recess, a collar mounted on the body portion and having an inclined surface adapted to engage the outer end of the wedge, said collar and body portion having coöperating screw threads formed thereon adapted to permit of reciprocation of the collar, whereby the inclined surface of the collar will force and maintain the screw threads of the wedge in clamping engagement with the screw threads of the spindle.

13. A chuck comprising a body portion having an internally screw threaded recess at one end and having a passage communicating with the recess, a plug extending from the body portion into the recess and having its outer surface spaced from the walls of the recess, adapted to receive the walls of an externally screw threaded hollow spindle, an externally screw threaded hollow spindle, the walls of the spindle and recess coöperating with one another, a wedge reciprocably mounted in the passage, having its inner end screw threaded for coöperation with the screw threads of the recess, a collar having an inclined surface adapted to engage the outer end of the wedge, said collar and body portion having coöperating screw threads formed thereon, adapted to permit of reciprocation of the collar to bring the inclined surface thereof into engagement with the wedge to force the screw threads of the wedge into clamping engagement with the screw threads of the spindle.

14. In a chuck the combination of an exteriorly screw threaded body having an interiorly screw threaded recess and transverse passages through its wall and communicating with the recess, reciprocably mounted wedges in the passages and having upon their inner ends screw threads registering with the screw threads upon the interior of the recess, and having their outer ends tapered and projecting beyond the external walls of the body, and a collar having internal screw threads to engage said external screw threads and having at its end an inclined inner surface engaging the tapered ends of the wedges.

In testimony whereof, I have hereunto subscribed my name this 18th day of December, 1916.

JAMES A. STANFIELD.

Witnesses:
GEORGE T. PROUT,
W. THORNTON BOGERT.

Copies of this patent may be obtained for five cents each, by addressing the "Commissioner of Patents, Washington, D. C."